United States Patent
Matus et al.

(10) Patent No.: US 11,151,813 B2
(45) Date of Patent: Oct. 19, 2021

(54) METHOD AND SYSTEM FOR VEHICLE-RELATED DRIVER CHARACTERISTIC DETERMINATION

(71) Applicant: Zendrive, Inc., San Francisco, CA (US)

(72) Inventors: Jonathan A. Matus, San Francisco, CA (US); Pankaj Risbood, San Francisco, CA (US); Aditya Karnik, San Francisco, CA (US)

(73) Assignee: Zendrive, Inc., San Francisco, CA (US)

( * ) Notice: Subject to any disclaimer, the term of this patent is extended or adjusted under 35 U.S.C. 154(b) by 0 days.

(21) Appl. No.: 16/022,120

(22) Filed: Jun. 28, 2018

(65) Prior Publication Data
US 2019/0005412 A1    Jan. 3, 2019

Related U.S. Application Data

(60) Provisional application No. 62/526,108, filed on Jun. 28, 2017.

(51) Int. Cl.
     *G06N 20/00*      (2019.01)
     *G07C 5/08*      (2006.01)
     (Continued)

(52) U.S. Cl.
     CPC ............. *G07C 5/085* (2013.01); *G06N 20/00* (2019.01); *G06Q 30/0201* (2013.01);
     (Continued)

(58) Field of Classification Search
     CPC ...... G06N 99/005; G06N 5/025; G06N 7/005; G06N 20/00; G06K 9/6256; G06K 9/6269
     (Continued)

(56) References Cited

U.S. PATENT DOCUMENTS 6,049,778 A    4/2000    Walker et al.
7,801,675 B2    9/2010    Currie et al.
(Continued)

FOREIGN PATENT DOCUMENTS

DE      3439000 A1    4/1986
DE    102008008555    8/2008
(Continued)

OTHER PUBLICATIONS

Short et al.—"Identifying Autonomous Vehicle Technology Impacts on the Trucking Industry"—http://atri-online.org/wp-content/uploads/2016/11/ATRI-Autonomous-Vehicle-Impacts-11-2016.pdf (Year: 2016).*

(Continued)

*Primary Examiner* — Viker A Lamardo
(74) *Attorney, Agent, or Firm* — Jeffrey Schox; Caitlin Ploch

(57) ABSTRACT

A method for characterizing a user associated with a vehicle including collecting a movement dataset sampled at least at one of a location sensor and a motion sensor associated with the vehicle, during a time period associated with movement of the vehicle; extracting a set of movement features associated with movement of at least one of the user and the vehicle during the time period; and determining one or more user characteristics describing the user based on the set of movement features, wherein the one or more user characteristics include a classification of the user as at least one of a passenger and a driver for the time period associated with movement of the vehicle.

20 Claims, 6 Drawing Sheets

(51) Int. Cl.
  *G06Q 30/02* (2012.01)
  *G06Q 50/00* (2012.01)
  *G07C 5/00* (2006.01)
  *G06Q 50/30* (2012.01)
  *G07C 9/25* (2020.01)

(52) U.S. Cl.
  CPC ............ *G06Q 50/01* (2013.01); *G06Q 50/30* (2013.01); *G07C 5/008* (2013.01); *G07C 9/257* (2020.01)

(58) Field of Classification Search
  USPC .......................................................... 706/12
  See application file for complete search history.

(56) References Cited

U.S. PATENT DOCUMENTS

| | | | |
|---|---|---|---|
| 8,264,375 B2 | 9/2012 | Devries | |
| 8,290,480 B2 | 10/2012 | Abramson et al. | |
| 8,489,330 B2 | 7/2013 | Ellanti et al. | |
| 8,504,035 B2 | 8/2013 | Shin et al. | |
| 8,731,530 B1 | 5/2014 | Breed et al. | |
| 8,738,523 B1* | 5/2014 | Sanchez ................ | G06Q 40/00 705/39 |
| 8,996,234 B1 | 3/2015 | Tamari et al. | |
| 9,368,027 B2 | 6/2016 | Jang et al. | |
| 9,414,221 B1 | 8/2016 | Simon et al. | |
| 9,467,515 B1 | 10/2016 | Penilla et al. | |
| 9,495,601 B2 | 11/2016 | Hansen | |
| 9,536,428 B1 | 1/2017 | Wasserman | |
| 9,773,281 B1 | 9/2017 | Hanson | |
| 9,854,396 B2 | 12/2017 | Himmelreich et al. | |
| 9,888,392 B1 | 2/2018 | Snyder et al. | |
| 9,900,747 B1 | 2/2018 | Park | |
| 2004/0046335 A1 | 3/2004 | Knox et al. | |
| 2005/0080555 A1 | 4/2005 | Parupudi et al. | |
| 2005/0093868 A1 | 5/2005 | Hinckley | |
| 2005/0197773 A1 | 9/2005 | Brewster et al. | |
| 2007/0208494 A1 | 9/2007 | Chapman et al. | |
| 2008/0103907 A1 | 5/2008 | Maislos et al. | |
| 2008/0243439 A1 | 10/2008 | Runkle et al. | |
| 2010/0056175 A1 | 3/2010 | Bachmann et al. | |
| 2010/0100398 A1 | 4/2010 | Auker et al. | |
| 2010/0106406 A1 | 4/2010 | Hille et al. | |
| 2010/0273508 A1 | 10/2010 | Parata et al. | |
| 2011/0124311 A1 | 5/2011 | Staehlin | |
| 2011/0246156 A1 | 10/2011 | Zecha et al. | |
| 2012/0089328 A1 | 4/2012 | Ellanti et al. | |
| 2012/0109517 A1 | 5/2012 | Watanabe | |
| 2012/0149400 A1 | 6/2012 | Paek et al. | |
| 2012/0245963 A1 | 9/2012 | Peak et al. | |
| 2013/0052614 A1 | 2/2013 | Mollicone et al. | |
| 2013/0096731 A1 | 4/2013 | Tamari et al. | |
| 2013/0130639 A1 | 5/2013 | Oesterling et al. | |
| 2013/0302758 A1 | 11/2013 | Wright | |
| 2013/0325517 A1 | 12/2013 | Berg | |
| 2013/0332357 A1 | 12/2013 | Green et al. | |
| 2014/0038640 A1 | 2/2014 | Wesselius et al. | |
| 2014/0046896 A1 | 2/2014 | Potter | |
| 2014/0081670 A1 | 3/2014 | Lim et al. | |
| 2014/0188638 A1 | 7/2014 | Jones et al. | |
| 2014/0232592 A1 | 8/2014 | Psiaki et al. | |
| 2014/0244150 A1 | 8/2014 | Boesch et al. | |
| 2014/0244156 A1 | 8/2014 | Magnusson et al. | |
| 2014/0288765 A1 | 9/2014 | Elwart et al. | |
| 2015/0229666 A1 | 8/2015 | Foster et al. | |
| 2015/0246654 A1 | 9/2015 | Tadic et al. | |
| 2015/0327034 A1* | 11/2015 | Abramson ............... | H04L 67/12 455/419 |
| 2015/0334545 A1 | 11/2015 | Maier et al. | |
| 2016/0021238 A1 | 1/2016 | Abramson et al. | |
| 2016/0033366 A1 | 2/2016 | Liu et al. | |
| 2016/0086285 A1 | 3/2016 | Jordan et al. | |
| 2016/0129913 A1* | 5/2016 | Boesen ................. | B60W 40/09 705/4 |
| 2016/0171521 A1 | 6/2016 | Ramirez et al. | |
| 2016/0174049 A1 | 6/2016 | Levy et al. | |
| 2016/0189442 A1 | 6/2016 | Wright | |
| 2016/0232785 A1 | 8/2016 | Wang | |
| 2016/0269852 A1 | 9/2016 | Meyers et al. | |
| 2016/0272140 A1 | 9/2016 | Kim et al. | |
| 2016/0379310 A1 | 12/2016 | Madigan et al. | |
| 2016/0379485 A1 | 12/2016 | Anastassov et al. | |
| 2016/0381505 A1 | 12/2016 | Sankaran | |
| 2017/0097243 A1 | 4/2017 | Ricci | |
| 2017/0116792 A1* | 4/2017 | Jelinek ................... | G06Q 50/30 |
| 2017/0126810 A1 | 5/2017 | Kentley et al. | |
| 2017/0234689 A1 | 8/2017 | Gibson et al. | |
| 2017/0371608 A1 | 12/2017 | Wasserman | |
| 2018/0174446 A1 | 6/2018 | Wang | |
| 2018/0308128 A1* | 10/2018 | Deluca et al. ..... | G06Q 30/0261 |

FOREIGN PATENT DOCUMENTS

| | | |
|---|---|---|
| EP | 0534892 A1 | 3/1993 |
| GB | 2492369 B | 4/2014 |
| JP | 2000009482 A | 1/2000 |
| JP | 2002215236 A | 7/2002 |
| JP | 2005098904 A | 4/2005 |
| JP | 2007212265 A | 8/2007 |
| JP | 2009133702 A | 6/2009 |
| JP | 2011133240 A | 7/2011 |
| JP | 2013195143 A | 9/2013 |
| JP | 2013200223 A | 10/2013 |
| KR | 20130106106 A | 9/2013 |
| WO | 2004085220 | 10/2004 |

OTHER PUBLICATIONS

Hon Lung Chu—"In-Vehicle Driver Detection Using Mobile Phone Sensors"—https://ece.duke.edu/sites/ece.duke.edu/files/GWDD2011_Chu.pdf—2011 (Year: 2011).*

Mohan, Prashanth et al., "Nericell: Rich Monitoring of Road and Traffic Conditions using Mobile Smartphones", Microsoft Research India, SenSys '08, Nov. 5-7, 2008, Raleigh North Carolina, USA, 14 pages.

"European Office Action application No. 16 837 957.6, dated May 29, 2019."

"Japanese Office Action application No. 2018-506604, dated Jun. 4, 2019."

Das Tathagata; et al."PRISM: Platform for Remote Sensing using Smartphones," in. Proc. Mobisys '10, Jun. 15-18, 2010, San Francisco, USA, pp. 63-76.

Mohan Prashanth; et al. Nericell: Rich Monitoring of Road and Traffic Conditions using Mobile Smartphones, SenSys '08, Nov. 5-7, 2008, Raleigh, North Carolina.

Giuseppe, Guido; et al. "Using Smartphones as a Tool to Capture Road Traffic Attributes", University of Calabria, Department of Civil Engineering, via P.Bucci, 87036—Rende (CS) Italy, Applied Mechanics and Materials, vol. 432 2013, Trans Tech Publications, Switzerland, pp. 513-519.

Kalra, Nidhi, Analyzing Driving and Road Events via Smartphone, International Journal of Computer Applications (0975-8887), vol. 98—No. 12, Jul. 2014, pp. 5-9.

Walter, Debbie, et al.,"Novel Environmental Features for Robust Multisensor Navigation", Institute of Navigation GNSS + 2013, pp. 1-6.

Walter D et al: "Novel Environmental Features for Robust Multisensor Navigation",GNSS 2013—Proceedings of the 26th International Technical Meeting of the Satellite Division of the Institute of Navigation, Manassas, VA, Sep. 20, 2013.

* cited by examiner

100

```
┌─────────────────────────────────────────────────────────────────┐
│ collecting a movement dataset sampled at least at one of a      │
│ location sensor and a motion sensor associated with the         │
│ vehicle, during a time period of movement of the vehicle S110ex │
└─────────────────────────────────────────────────────────────────┘
                    │
                    ▼
┌─────────────────────────────────────────────────────────────────┐
│ collecting a supplementary dataset configured to supplement the │
│                    movement dataset S120                        │
└─────────────────────────────────────────────────────────────────┘
                    │
                    ▼
┌─────────────────────────────────────────────────────────────────┐
│ extracting a set of movement features from the movement         │
│ dataset S130                                                    │
│   ┌───────────────────────────────────────────────────────────┐ │
│   │ extracting a set of movement features associated with     │ │
│   │ movement of at least one of the user and the vehicle      │ │
│   │ during the time period S130ex                             │ │
│   └───────────────────────────────────────────────────────────┘ │
└─────────────────────────────────────────────────────────────────┘
                    │
                    ▼
┌─────────────────────────────────────────────────────────────────┐
│ determining one or more user characteristics describing the     │
│ user based on the set of movement features wherein the one or   │
│ more user characteristics include a classification of the user  │
│ as at least one of a passenger and a drive S140                 │
│   ┌───────────────────────────────────────────────────────────┐ │
│   │ classifying the user as at least one of a passenger and   │ │
│   │ a driver for the time period associated with movement of  │ │
│   │ the vehicle S140ex                                        │ │
│   └───────────────────────────────────────────────────────────┘ │
└─────────────────────────────────────────────────────────────────┘
                    │
                    ▼
┌─────────────────────────────────────────────────────────────────┐
│ initiating a user-related action based on the one or more user  │
│                      characteristics S150                       │
│  ┌──────────────────────────────┐ ┌────────────────────────────┐│
│  │ promoting user-related       │ │ facilitating insurance     ││
│  │ notifications                │ │ processing                 ││
│  └──────────────────────────────┘ └────────────────────────────┘│
└─────────────────────────────────────────────────────────────────┘
```

FIGURE 3

METHOD AND SYSTEM FOR VEHICLE-RELATED DRIVER CHARACTERISTIC DETERMINATION

CROSS-REFERENCE TO RELATED APPLICATIONS

This application claims the benefit of U.S. Provisional Application No. 62/526,108, filed 28 Jun. 2017, which is incorporated herein in its entirety by this reference.

TECHNICAL FIELD

This invention relates generally to the vehicle telematics field, and more specifically to a new and useful method and system for determining driver characteristics associated with one or more vehicles.

BRIEF DESCRIPTION OF THE FIGURES

FIG. 3 depicts a flowchart representation of a variation of the method;

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
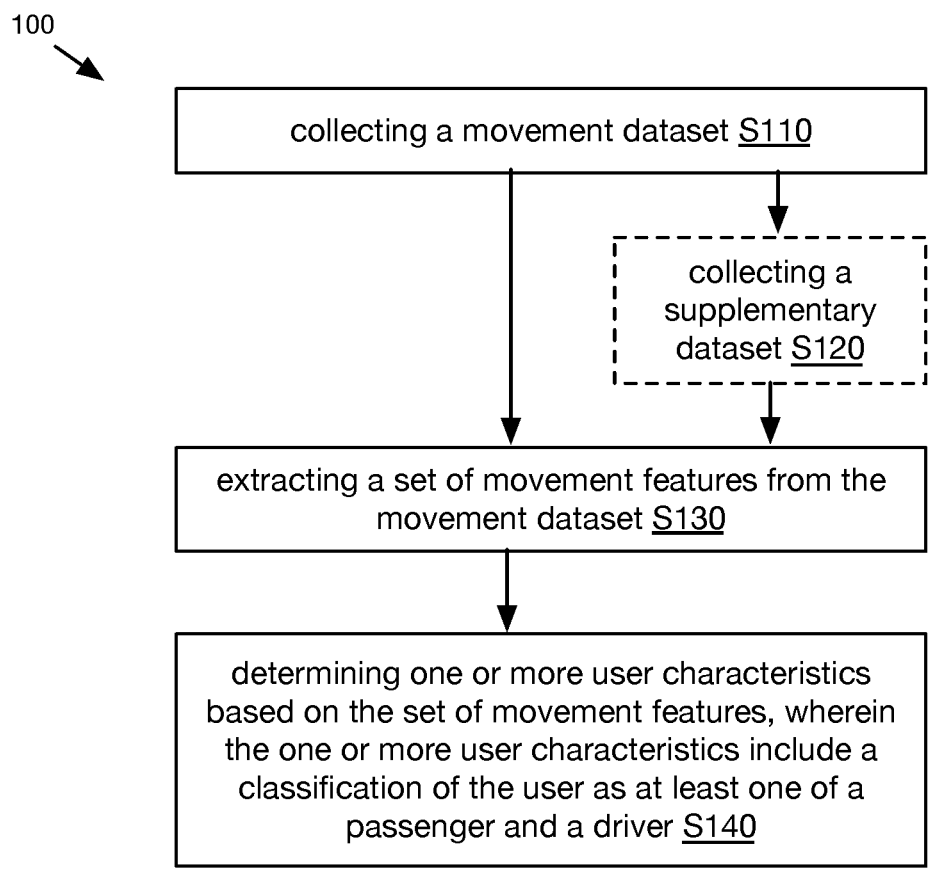
FIG. 1 depicts a flowchart representation of a variation of the method for vehicle-related driver characteristic determination.
Figure 2:
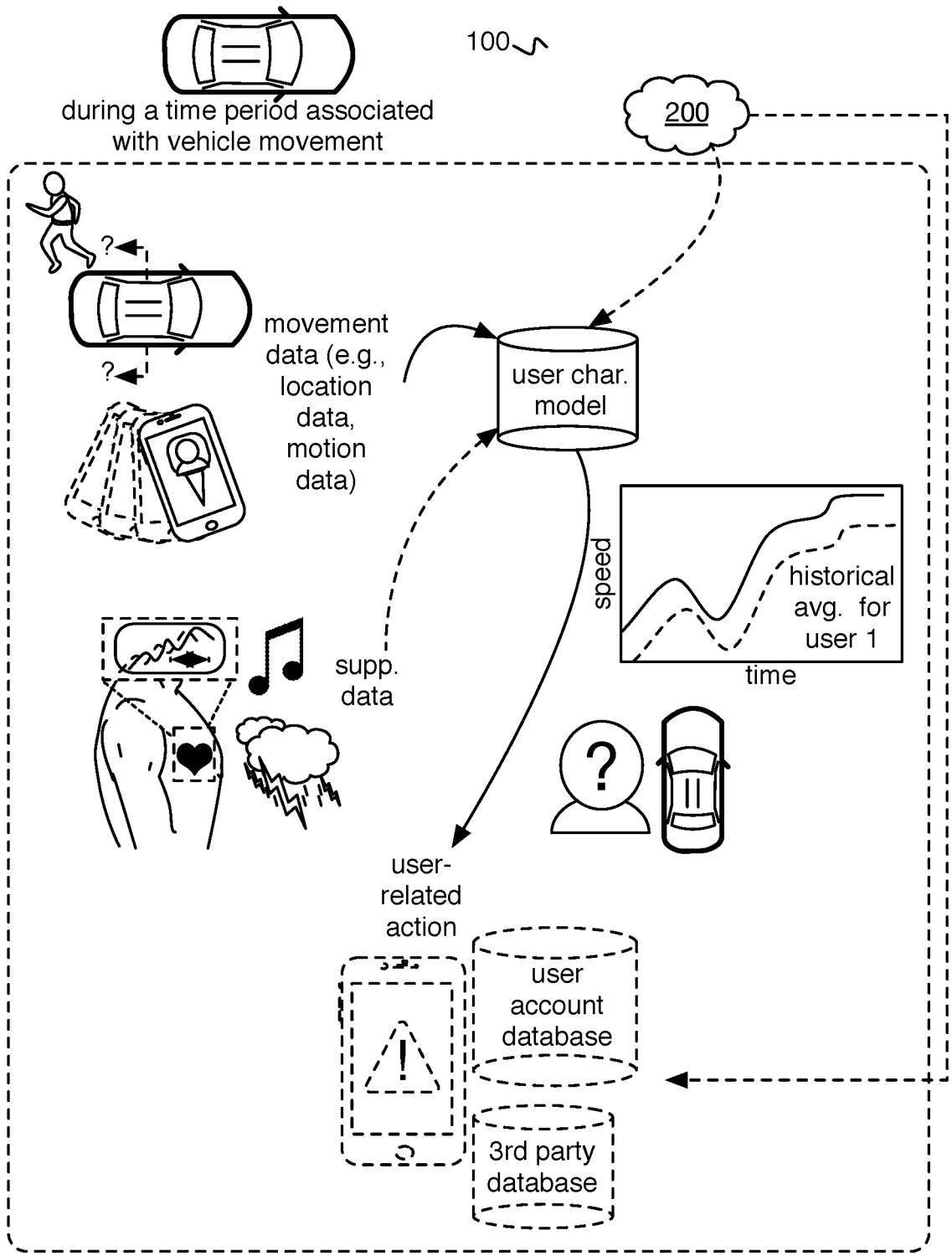
FIG. 2 depicts a graphical representation of a variation of the method.

As shown in FIGS. 1-3, embodiments of a method 100 for characterizing a user associated with a vehicle can include: collecting a movement dataset S110 (e.g., sampled at least at one of a location sensor and a motion sensor associated with the vehicle, during a time period associated with movement of the vehicle S110ex); extracting a set of movement features from the movement dataset S130 (e.g., wherein the set of movement features is associated with movement of at least one of the user and the vehicle during the time period S130ex); and determining one or more user characteristics based on the set of movement features, wherein the one or more user characteristics include a classification of the user as at least one of a passenger and a driver S140 (e.g., for the time period associated with movement of the vehicle S140ex). Additionally or alternatively, the method 100 can include: collecting a supplementary dataset configured to supplement the movement dataset S120; initiating a user-related action based on the one or more user characteristics S150; and/or any other suitable processes. Embodiments of the method 100 and/or system 200 function to identify one or more characteristics regarding one or more users associated with a vehicle (e.g., residing in and/or on the vehicle), such as in real-time, using at least one of movement data and supplemental data. Additionally or alternatively, the method 100 and/or system 200 can function to leverage the user characteristics in determining and/or promoting a user-related action (e.g., providing vehicle guidance; etc.).

As such, applications of the method 100 can be used to determine if a user associated with a computing device operating within the vehicle is a driver or a passenger, based upon one or more sensor signals of the computing device. The method 100 can then be used to generate driver analytics, which can be used to guide driving behavior of the driver and/or adjust insurance policy parameters of the driver. Applications of the method 100 can alternatively operate in any other suitable manner.

The method 100 is preferably implemented on one or more mobile devices removably coupled to one or more vehicles (e.g., through users, through a mounting system, etc.). Additionally or alternatively, the method 100 can be implemented by any number of suitable devices (e.g., including the vehicle itself; remote computing systems; etc.). One or more instances of the method 100 and/or processes described herein can be performed asynchronously (e.g., sequentially), concurrently (e.g., in parallel; concurrently on different threads for parallel computing to improve system processing ability; etc.), in temporal relation to a trigger event, and/or in any other suitable order at any suitable time and frequency by and/or using one or more instances of the system 200 (e.g., a system 200 including processing systems such as remote computing systems; sensors; vehicles; mobile devices; etc.), elements, and/or entities described herein. However, the method 100 and/or system 200 can be configured in any suitable manner.

2. Benefits

In specific examples, the method 100 and/or system 200 can confer several benefits over conventional methodologies used for determining user characteristics in relation to vehicles. In specific examples, the method 100 and/or system 200 can perform one or more of the following:

First, the technology can leverage non-generic location data (e.g., GPS data) and/or motion data (e.g., accelerometer data, gyroscope data) to conveniently and unobtrusively determine a user characteristic. In examples, the location data and/or motion data can be passively collected at a user's mobile computing device (e.g., a smartphone), such that the technology can perform user characteristic determination without requiring a user to purchase additional hardware.

Second, the technology can determine user characteristics with high accuracy. In examples, the technology can accurately distinguish between drivers (e.g., vehicle operators, users who are responsible for driving the vehicle, etc.) and passengers (e.g., users who occupy a vehicle during operation without driving, front passengers, rear passengers, etc.), thereby minimizing the detection of false positives. Further, the technology can provide accurate user characteristic determination while allowing a user to have flexibility in placement of their mobile computing device in relation to the vehicle (e.g., motor vehicles, bicycles, watercraft, aircraft, spacecraft, railed vehicles, etc.). User characteristics can be determined when the mobile computing device collecting movement data is in a user's pocket, in a user's hand, mounted within the car, in a cup holder, and/or in other suitable locations within the vehicle.

Third, the technology can automatically initiate user-related actions in response to determination of user characteristics. User-related actions can include any one or more of controlling the user device, sending a notification to the user or a related entity, generating user-specific content, and/or other suitable user-related actions. Further, in examples, the type of initiated user-related action can be tailored to the particular user characteristic based on movement data and/or supplemental data. In examples, the technology can include a software development kit for third-parties to integrate the user characteristic determination features, thereby enabling third-parties to leverage user characteristics and related data for purposes of driving education, ride sharing, valet services, navigation, roadside assistance, insurance processing, emergency services, and/or other suitable services.

Fourth, the technology can determine user characteristics events in real-time (e.g., instantaneously, substantially real-time, near real-time, etc.). Prompt determination of user characteristics (e.g., discrimination between drivers and passengers) can enable timely provision (e.g. during the in-trip time period) of appropriate messages (e.g., driver specific messages, passenger specific messages, etc.) to the user.

Fifth, the technology can improve the technical fields of at least vehicle telematics, computational modeling of user characteristics, and user characteristic determination with mobile computing device data. The technology can continuously collect and utilize non-generic sensor data (e.g., location sensor data, motion sensor data, GPS data, audio/visual data, ambient light data, etc.) to provide real-time determination of user characteristics (e.g., user type between driver and passenger, driver behavior, passenger behavior, etc.) Further, the technology can take advantage of the non-generic sensor data and/or supplemental data (e.g., vehicle sensor data, weather data, traffic data, biosignal sensor data, etc.) to better improve the understanding of correlations between such data and user characteristics, leading to an increased understanding of variables affecting user behavior while driving and/or riding in a vehicle.

Sixth, the technology can provide technical solutions necessarily rooted in computer technology (e.g., utilizing computational models to determine user characteristics from non-generic location and/or motion datasets collected at mobile computing devices, etc.) to overcome issues specifically arising with computer technology (e.g., issues surrounding how to leverage movement data collected by a mobile computing device to determine user characteristics, and/or to automatically initiate user-related actions for responding to user characterizations, etc.).

Seventh, the technology can leverage specialized computing devices (e.g., computing devices with GPS location capabilities, computing devices with motion sensor functionality, etc.) to collect specialized datasets for characterizing users in the vehicle (e.g., as one of a driver or a passenger).

Eighth, the technology can enable a user's in-trip behavior to be correctly attributed to the user's role in the trip (e.g., whether the user is a driver or a passenger), which can enable more accurate assessment of the user's risk profile. For example, a user that utilizes a ride share service for transport can be driven by risky drivers as a passenger, and the method can enable the user to avoid penalization for driving in a risky manner (e.g., in cases wherein they are not the driver).

The technology can, however, provide any other suitable benefit(s) in the context of using non-generalized computer systems for determining one or more user characteristics.

3.1 Method—Collecting a Movement Dataset

Block S110 includes collecting a movement dataset sampled at least at one of a location sensor and a motion sensor associated with the vehicle, during a time period of movement of the vehicle. Block S110 functions to collect movement-related data for use in characterizing users (e.g., a vehicle driver, vehicle passenger, pedestrian, etc.) associated with the vehicle (e.g., motor vehicles, bicycles, watercraft, aircraft, spacecraft, railed vehicles, etc.). Movement datasets preferably describe at least one of position (e.g., location), velocity, and/or acceleration (PVA) of one or more vehicles, user devices (e.g., user smartphones), users, and/or any other suitable entities, but can additionally or alternatively describe any suitable movement-related characteristic. Movement datasets are preferably sampled at one or more movement sensors indicative of one or more of motion and/or location, which can include one or more of: motion sensors (e.g., multi-axis and/or single-axis accelerometers, gyroscopes, etc.), location sensors (e.g., GPS data collection components, magnetometer, compass, altimeter, etc.), optical sensors, audio sensors, electromagnetic (EM)-related sensors (e.g., radar, lidar, ultrasound, infrared radiation, magnetic positioning, etc.), environmental sensors (e.g., temperature sensors, etc.), biometric sensors, and/or any other suitable sensors. Movement datasets can include motion datasets (e.g., data describing motion of the mobile device) and/or location datasets (e.g., data describing the local position of the mobile device, data describing the absolute or global position of the mobile device, etc.); movement data can thus include motion data and/or location data, and Blocks of the method 100 and/or variations thereof described in relation to movement datasets can additionally or alternatively be suitably implemented in relation to motion and/or location datasets.

In a variation, Block S110 can include deriving movement data from collected signal data (e.g., in relation to EM signals transmitted and/or received by mobile devices, vehicles, etc.), such as based on signal quality (e.g., in-vehicle WiFi signal quality; differences in cellular signal quality for mobile devices within a vehicle; Bluetooth signal quality between mobile devices in a vehicle, between mobile devices and a vehicle media system; etc.), received signal strength indicators, Wi-Fi positioning system parameters, signal angle of arrival (e.g., with directional sensors), and/or any other suitable signal-related data. In another variation, Block S110 can include deriving movement data from visual data (e.g., deriving PVA data from video taken by a smartphone's camera and/or vehicle camera; derived from visual markers captured in optical data, such as geographical markers, markers indicated by satellite imagery; etc.) and/or audio data (e.g., deriving motion from Doppler effects captured in data from the smartphone's microphone, etc.). In another variation, Block S110 can include collecting laser rangefinder data sampled using lasers associated with a vehicle. However, movement data can be derived from any suitable data types.

Block S110 preferably includes collecting one or more location datasets, which can include any one or more of: GPS data (e.g., position coordinates, associated time stamps, etc.), indoor positioning system data, local positioning system data, multilateration data, GSM localization data, self-reported positioning, control plane locating data, compass data, magnetometer data, and/or any other suitable location-related data. In an example, GPS data can be leveraged for complete PVA solutions, but can additionally or alternatively include any movement data, such as retrieved using GNSS data (e.g., via GLONASS, Galileo, BeiDou). In another example, proximity sensors associated with mobile phones (e.g., for capacitive proximity sensing; IR-based proximity sensing; etc.) can be used to in determining location of objects (e.g., users within a vehicle). In another example, Block S110 can include collecting a micro-location dataset (e.g., sampled using beacons within and/or mounted to a vehicle). In another example, Block S110 can include collecting a location dataset sampled by a mobile device and indicating the location of the mobile device within the vehicle (e.g., proximal the front of vehicle, back of vehicle, left side of the vehicle, right side of the vehicle, etc.). The location of the mobile device within the vehicle can be determined on an absolute basis (e.g., in terms of the distance of the mobile device from a vehicle component), a relative basis (e.g., relative to the location of other mobile devices of a plurality arranged within the vehicle), and on any other suitable basis. However, collecting location datasets can be performed in any suitable manner. Collecting location datasets in accordance with one or more variations of Block S110 can be performed using any suitable location sensor (e.g., of the mobile device, such as a GPS sensor of the mobile device; of the vehicle, in communication with the mobile device; etc.).

Block S110 preferably includes collecting one or more motion datasets, which can include one or more of: accelerometer data (e.g., single-axis data, multi-axis data), gyroscope data (e.g., single-axis data, multi-axis data), velocity data (e.g., speed, instantaneous velocity, average velocity, change in velocity, velocity variability over time, maximum velocity, minimum velocity, etc.), acceleration data (e.g., instantaneous acceleration, gravitational acceleration, average acceleration, change in acceleration, acceleration variability over time, maximum acceleration, minimum acceleration, acceleration direction, acceleration vector, etc.), displacement data, orientation data, rotation data (e.g., clockwise vs. counterclockwise rotation data), turning data (e.g., turning of the mobile device about any suitable origin with any suitable turning radius), and/or any other suitable motion-related data. In an example, Block S110 can include collecting a motion dataset for a user entering or exiting a vehicle (e.g., where the motion dataset can be indicative of whether the user is a driver or passenger entering or exiting the vehicle from a driver seat door or passenger seat door; where the motion dataset indicates walking patterns of the user in relation to entering or exiting a vehicle; etc.). However, collecting motion datasets can be performed in any suitable manner.

In relation to Block S110, movement datasets (and/or supplemental datasets) are preferably sampled by components arranged at a mobile device (e.g., smartphone, laptop, tablet, smart watch, smart glasses, virtual reality devices, augmented reality devices, aerial devices such as drones, medical devices, etc.), but can additionally or alternatively be sampled by components associated with (e.g., arranged at, positioned within, mounted to, physically connected to, etc.) any suitable device and/or vehicle (e.g., movement datasets sampled at vehicle sensors). Movement datasets (and/or supplemental datasets) are preferably associated with one or more users (e.g., collected at a mobile device of the user; collected at a mobile device physically proximal a user; stored in association with user accounts for one or more users; etc.), but can be associated with any suitable entities. Block S110 preferably includes collecting movement data continuously from mobile computing devices in a vehicle (e.g., during vehicle operation), such as in real-time, but can additionally or alternatively include collecting movement data periodically (e.g., at vehicle stoppage events, at predetermined time intervals such as every minute, etc.), and/or in response to satisfaction of trigger conditions (e.g., movement thresholds, supplementary data conditions, etc.), but collecting movement datasets and/or at any suitable time and frequency. Movement datasets are preferably associated with one or more temporal indicators (e.g., a time point, a time window, a time period) describing when the movement data was collected, but can correspond to any suitable temporal indicator or be time-independent.

Block S110 can include collecting movement data associated with any suitable number of mobile devices, user, vehicles, and/or other entities. For example, Block S110 can include collecting movement data from a single mobile device (e.g., associated with a driver; with a passenger; etc.) associated with a vehicle. In another example, Block S110 can include collecting movement data from a plurality of mobile devices (e.g., associated with a driver and one or more passengers; associated with a plurality of passengers; etc.) associated with a vehicle. In another example, Block S110 can include collecting movement data for a first vehicle from devices in geographically proximal vehicles (e.g., a second vehicle), from devices associated with pedestrians, and/or from other supplementary device. Multiple sources of movement data can be used to reduce noise (e.g., through averaging data), improve data accuracy, fill gaps of movement data during a time period, increase confidence levels associated with determining user characteristics and/or initiating user-related actions, and/or perform any suitable operation in relation to the method 100.

Figure 5:
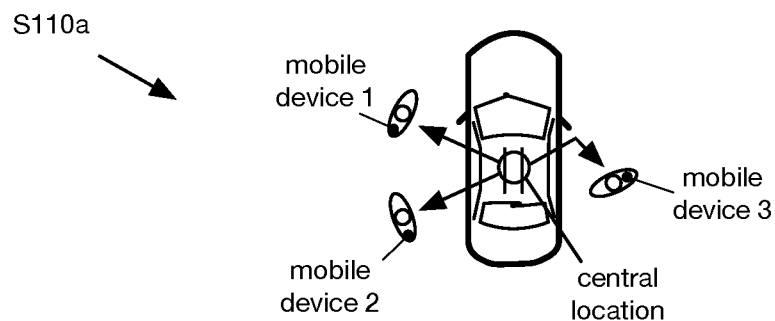
FIG. 5 depicts a specific example of a portion of a variation of the method.

In relation to Block S110, movement datasets can be collected at various time periods with respect to a driving session (e.g., a trip, an operation period, etc.). For example, Block S110 can include collecting an in-trip movement dataset corresponding to an in-trip time period (e.g., a time period in which the vehicle is moving, a time period associated with movement of the vehicle, a time period between two points on a multi-destination trip, etc.). The in-trip time period can be determined based on the movement data via pattern matching (e.g., wherein motion or location data sampled at the mobile device corresponds to a motion and/or location pattern indicative of vehicle motion), a trigger event (e.g., breaking a geofence, exceeding a threshold speed and/or acceleration value that is only achievable in a vehicle, etc.), and any other suitable mechanism of determination. In another example, Block S110 can include collecting a post-trip movement dataset corresponding to a post-trip time period (e.g., a time period immediately subsequent to a trip, after the vehicle has stopped moving, at an intermediate destination along a multi-destination route, etc.). The post-trip time period can be determined based on the movement data via pattern matching (e.g., wherein motion or location data sampled at the mobile device corresponds to a stationary location indicative of the cessation of vehicle motion), a trigger event (e.g., a timeout after an elapsed time greater than a threshold value corresponding to typical in-trip traffic stoppages), extraction of motion or location data characteristic of egressing a vehicle (e.g., Block S110a: determining departure of the location associated with a mobile device from a central location determined based on a plurality of movement datasets associated with a plurality of mobile devices as shown in FIG. 5; determination of characteristic motion data associated with vehicle egress or ingress; etc.), and any other suitable mechanism of determination. The post-trip time period preferably includes a time period wherein one or more vehicle occupants egresses the vehicle, but can additionally or alternatively include time periods wherein one or more users enters the vehicle, wherein the number of vehicle occupants remains unchanged, and any other suitable time periods subsequent to the in-trip time period. In variations, Block S110 can include continuously collecting a movement dataset across an in-trip and post-trip time period, and associating portions of the movement dataset with the in-trip and post-trip time periods, respectively, subsequent to data collection (e.g., after the trip has concluded, periodically while executing a data collection application on the user device irrespective of the times at which trips are conducted, etc.).

In variations, Block S110 can include collecting movement datasets and/or other data substantially as described in U.S. application Ser. No. 14/206,721, filed 12 Mar. 2014, and/or as described in U.S. application Ser. No. 15/652,558, filed 18 Jul. 2017, which are each incorporated herein by this reference; however, Block S110 and/or variations thereof can additionally or alternatively be performed in any suitable manner.

3.2 Method—Collecting Supplementary Data

The method 100 can additionally or alternatively include Block S120, which includes collecting supplementary data during a time period at one or more devices associated with the user. Block S120 functions to collect data that can be used in combination with, to filter, to control for errors in, and/or otherwise supplement movement data collected in Block S110. In relation to Block S120, supplementary data can include any one or more of: user dataset (e.g., indicative of user information describing one or more characteristics of one or more users, etc.), audio data (e.g., associated with a phone call; associated with conversations involving one or more users in a vehicle, which can indicate the number of users present in a vehicle; including content informative of one or more user characteristics, such as driver behavior in response to a traffic-heavy route; environmental audio; vehicular audio; etc.), optical data (e.g., imagery; video; internal vehicle-facing optical data of users and/or corresponding locations within a vehicle; external vehicle-facing optical data of route, landmarks, geographical markers; optical data capturing a user entering or exiting the vehicle from the driver side or passenger side; mobile computing device camera data; etc.), vehicle operation data (e.g., vehicle proximity sensor data; OBD data; vehicle operation data; vehicle camera data; PVA data; fuel data; motion sensor data; etc.), traffic data (e.g., type of vehicular path such as freeway road or local road, which can be correlated with user driving preferences; accident data; traffic level; traffic laws; etc.), biometric data (e.g., cardiovascular parameters, such as heart rate, which can be indicative of user driving behavior in response to different traffic conditions; sleep metrics; respiration data; biological fluid data; etc.), environmental data (e.g., weather conditions, which can be correlated with frequency of a particular user to operate a vehicle during such weather conditions; road conditions; pressure conditions; air quality; etc.), and/or any other suitable data for facilitating user characterization and/or user-related actions.

Relating to Block S120, user datasets can include any one or more of: behavioral datasets (e.g., driving behavior-related data upon which driving behavior profiles can be generated for users and/or user accounts; social media datasets derived from social media actions taken by the user and/or related to the user; physical activity datasets associated with movement patterns of the user; etc.); demographic datasets (e.g., nationality, ethnicity, age, gender, etc.); device event datasets (e.g., associated with text messaging; phone calling; device idling; device charging; application usage; sensor usage; intelligent personal assistants; outputs such as media casting; inputs; etc.), and/or any other suitable datasets associated with a user. In a specific example, Block S120 can include determining nearby mobile devices (e.g., associated with other users), such as whether any such nearby mobile devices are in the same vehicle, how many nearby mobile devices are present, and any other suitable information regarding nearby mobile devices. In this example, nearby mobile devices can be determined via a "nearby API" feature of one or more mobile devices (e.g., Android device, iOS device, etc.); however, in related or alternative examples, nearby mobile device data can be otherwise suitably determined).

Block S120 preferably includes collecting supplementary data at a device used in collecting movement data (e.g., user smartphone, but can additionally or alternatively include collecting supplementary data at a distinct device (e.g., other mobile computing device, medical device, other user device, third party database, etc.). For example, Block S120 can include collecting device event data (e.g., application usage, locks, unlocks, etc.) from a mobile computing device during a time period in which movement data from the mobile computing device is being collected. Block S120 preferably includes passively collecting supplementary data (e.g., without requiring human intervention), but can additionally or alternatively include actively collecting supplementary data (e.g., from presenting a digital survey to the user at the mobile computing device, etc.). In a specific example, Block S120 can include prompting, at an application executing on the mobile computing device, the user to input vehicle information (e.g., vehicle model information; number of seats in the vehicle; size of vehicle; driver seat door location; passenger seat door locations; etc.), user information (e.g., demographic information, behavioral data, etc.), and/or any other suitable information. In another specific example, Block S120 includes detecting a signal emitted by the vehicle (e.g., a transponder signal, a visual signal, an audible signal, a radio signal, an NFC signal, etc.) indicative of a vehicle operating mode (e.g., that the vehicle is operating in an autonomous mode, a semi-autonomous mode including advanced driver-assist features, a teleoperation mode, a manually driven mode, etc.). Block S120 can include determining that a mobile device has paired with a vehicle (e.g., via Bluetooth, BLE, etc.), which can provide data for use in one or more variations of Block S140 (e.g., wherein pairing between the mobile device and the particular vehicle can be historically associated with the user being classified as a driver, wherein the user is the owner and sole registered driver of the vehicle to which it is paired, etc.). The determined vehicle operating mode can be used in other portions of the method 100 as a primary or secondary determinant in determining user characteristics (e.g., wherein all users in the vehicle are designated as passengers upon detection of a signal indicating that the vehicle is operating autonomously).

In another example, Block S120 includes collecting a supplementary dataset during the in-trip period using the mobile device, wherein the supplementary dataset includes an audio-visual dataset (e.g., imagery, ambient light data, cabin noise data, audio recordings of cabin noise, music, and/or conversations, etc.) collected using an audio-visual sensor of the mobile device (e.g., a microphone, a camera, an ambient light sensor, etc.).

Relating to Block S120, supplementary data is preferably associated with a temporal indicator that is the same and/or overlapping with a temporal indicator associated with movement data. For example, the method 100 can include collecting a movement dataset at a mobile computing device during a time period, and collecting a supplementary dataset at the mobile computing device during the same time period or an overlapping time period. Additionally or alternatively, the supplementary data can be associated with a temporal indicator distinct from temporal indicators associated with movement data, but can otherwise be associated with any suitable temporal indicator or be time independent. Additionally or alternatively, any characteristics described in relation to movement datasets (e.g., in Block S110) can additionally or alternatively apply to supplementary datasets (e.g., collecting supplementary datasets at any time and/or frequency from one or more mobile devices associated with vehicles; etc.).

However, collecting supplementary datasets S120 can be performed in any suitable manner.

3.3 Method—Processing Datasets

Block S130 includes extracting a set of movement features associated with movement of at least one of the user and the vehicle during the time period. Block S130 functions to process data (e.g., collected in Blocks S110 and/or S120; output in Blocks S140 and/or S150, etc.) into a form suited for characterizing users and/or promoting user-related actions. Processing data can include any one or more of: extracting features, performing pattern recognition on data, fusing data from multiple sources, combining values (e.g., averaging values, normalizing values, etc.), standardizing, validating, converting (e.g., digital-to-analog conversion, analog-to-digital conversion), wave modulating, filtering (e.g., Kalman filtering), noise reduction, smoothing, model fitting, transforming, windowing, clipping, mapping, applying mathematical operations (e.g., derivatives, moving averages, etc.), multiplexing, demultiplexing, and/or any other suitable processing operations. In a variation, processing data can include applying one or more computer-implemented rules (e.g., feature engineering rules for extracting movement features from one or more datasets) in processing data for conferring improvements (e.g., in accuracy of user characterizations such as classification as driver or passenger; in storing and/or retrieving data such as user characterization models and/or model inputs; in inventive distributions of functionality across networks, such as through allocation of user characterization functionality to an application executing on the mobile device rather than through processing and communication with a remote server; etc.) in one or more aspects of the system 200. However, any suitable computer-implemented rules can be applied in performing any suitable portion of the method 100 (e.g., model generation and/or selection rules for characterizing users; user preference rules for promoting user-related actions; etc.) and/or in conferring any suitable improvements to the system 200.

Block S130 preferably includes extracting one or more movement features from at least one of a movement dataset and a supplementary dataset, but movement features can be derived from any suitable data. Movement features are preferably associated with at least one of PVA characterizing the movement of the vehicle, user, device, and/or other suitable entity during a time period. Movement features can include any one or more of: raw movement data (e.g., raw location data, raw motion data, etc.), processed movement data, movement profiles (e.g., driving profile, braking profile, position profile, speed profile, acceleration profile, turning profile, etc.), identified driving actions (e.g., parking, acceleration, braking, short following, lane-departure, freewheeling, U-turn, left turn, right turn, over-revving, stationary vehicle, moving vehicle, etc.), user physical activity features (e.g., user cardiovascular parameters; walking pace; walking routes to and/or from vehicles; breathing parameters; physical activity characteristics before, during, and/or after driving sessions; etc.), and/or any other suitable features.

In relation to Block S130, extracting movement features can be performed at a remote computing system, the onboard computing system, and/or any other suitable system configured to extract movement features as described above, in any suitable location. Movement features can be extracted in real time, substantially real time, after data collection (e.g., immediately after, delayed by any suitable time delay, etc.), and at any other suitable time. Extracted movement features can be associated with an in-trip time period, a post-trip time period, a pre-trip time period, and any other suitable time period in relation to vehicle motion Block S130 can include comparing extracted movement features (e.g., generating comparisons between movement features and/or other extracted information). Comparing movement features functions to determine data that can be used to determine user characteristics (e.g., in accordance with one or more variations of Block S140). For example, Block S130 can include generating a comparison between in-trip movement features and vehicle motion features (e.g., to determine the relative heading between the mobile device and the vehicle at each time point during the in-trip period).

Block S130 can include extracting movement features (e.g., in-trip movement features, post-trip movement features, etc.) based on the movement dataset(s) in combination with supplementary datasets (e.g., an audio-visual dataset, a detected transponder signal, etc.) For example, Block S130 can include determining that a user has inserted or removed the mobile device into or from their pocket based on ambient light data (e.g., collected in accordance with one or more variations of Block S120) and extracting movement features from a movement dataset associated with the time period wherein the mobile device is inside the user's pocket.

Block S130 can include determining user data based on supplementary datasets. For example, Block S130 can include detecting that a user transmitted a text message by way of the mobile device, based on a supplementary dataset defining a user interaction with the mobile device (e.g., collected in accordance with one or more variations of Block S120). In this example and related examples, Block S130 can include querying the operating system of the mobile device, executing a monitoring application on the mobile device, and otherwise suitably determining user data.

Block S130 can include extracting route traces from movement datasets (e.g., location datasets). Route traces can include mapping data corresponding to vehicle locations (e.g., vehicle positions) and headings (e.g., vehicle headings, ordinate direction of the vehicle, etc.) at each time point during a trip (e.g., an in-trip period, a post-trip period, etc.), PVA data corresponding to a vehicle at each location along a vehicle route, and any other suitable data defining a vehicle route. The time points within a trip-related time period (e.g., an in-trip period, a post-trip period, etc.) can define any suitable temporal resolution (e.g., 100 Hz, 1 kHz, 1-5 Hz, etc.).

Block S130 can include matching an extracted route trace against a route trace database, which can function to identify one or more route traces stored in the route trace database that correspond to the same trip as the extracted route trace. The route trace (e.g., the extracted route trace, the matched route traces, etc.) can be associated with movement dataset(s) collected during the trip (e.g. in-trip, post-trip, etc.) that defines the route trace. Block S130 can include extracting movement features from the movement dataset(s) associated with the one or more matched route traces, which can correspond to additional mobile devices. Thus, Block S130 can include identifying a group of route traces corresponding to the same trip and/or same portion of various overlapping trips (e.g., by matching a portion of a route trace against portions of route traces in the route trace database), wherein each route trace of the group corresponds to a distinct mobile device, and extracting movement features (e.g., vehicle motion features, mobile device motion features, other motion features, features as described above, etc.) from each of the movement datasets associated with each route trace.

In a specific example, Block S130 includes extracting user egress directions relative to the vehicle heading from two movement datasets, wherein the first movement dataset is collected from a user's mobile device and the second movement dataset is obtained from a matched route trace matching the route trace extracted from the first movement dataset (e.g., wherein the matched route trace is obtained from a route trace database), and generating a comparison between the user egress directions (e.g., wherein the first user egress direction is from the driver's side and the second user egress direction is from the passenger's side of the vehicle). In this example and related examples, the vehicle heading is known from the movement dataset corresponding to the in-trip time period. In alternative examples, a user ingress direction relative to a vehicle heading can be determined (e.g., associated with a pre-trip period), wherein the vehicle heading is inferred from related subsequent movement datasets collected in the in-trip period.

In variations, Block S130 can include processing data collected from a mobile device substantially as described in U.S. application Ser. No. 14/206,721, filed 12 Mar. 2014, and/or as described in U.S. application Ser. No. 15/652,558, filed 18 Jul. 2017, which are each incorporated herein by this reference; however, Block S130 can additionally or alternatively include processing at least one of a movement dataset and a supplementary dataset in any suitable manner.

3.4 Method—Determining a User Characteristic

Block S140 includes: determining one or more user characteristics describing the user based on the set of movement features, wherein the one or more user characteristics includes a classification of the user as one of a passenger and a driver. Block S140 can thus include classifying the user as one of a passenger and a driver, based on movement features (e.g., extracted in accordance with one or more variations of Block S130). Block S140 functions to characterize one or more users in relation to one or more vehicles (e.g., as a passenger, as a driver, as a skilled driver, as an attentive passenger, etc.). User characteristics preferably include a classification of the user as at least one of a passenger of a vehicle, a driver of a vehicle, and/or other suitable entity related to the vehicle (e.g., owner of the vehicle; individual with access to vehicle operation; etc.) for one or more driving sessions. For example, determining one or more user characteristics can include classifying a user as a passenger for a first portion of a driving session, and a driver for a second portion of the driving session (e.g., where the user switched to being a driver at a vehicle stoppage event between the first and the second portions of the driving session, etc.). In another example, a first classification of a first user as a passenger and/or driver can be used in determining a second classification of a second user as a passenger and/or driver. In a specific example, Block S140 can include: determining that the vehicle is carrying two users (e.g., based on optical data); classifying a first user of the two users as a passenger (e.g., based on device event data for a mobile device associated with the first user); and in response to classifying the first user, classifying the second user of the two users as a driver (e.g., given that the vehicle carries two users and the other user was classified as a passenger). In another example, Block S140 can include: identifying each user in autonomous vehicle as a passenger, where determining one or more user characteristics can include determining one or more characteristics about the autonomous vehicle operation (e.g., user operation of the autonomous vehicle; autonomous vehicle driving behavior; etc.). However, classifying users can be performed in any suitable manner.

In relation to Block S140, additionally or alternatively, user characteristics can include any one or more of: activity parameters (e.g., type of activity that a user is participating in, such as texting during the driving session; degree of activity that a user is participating in, such as number of mobile device pickups, interactions, transmissions, etc.; nature of activity that a user is participating in, such as typing speed, typing accuracy, handsfree interaction, voice-to-text utilization, etc.; any other suitable parameters of user activity, etc.); vehicle parameters (e.g., type of vehicle associated with the driving session, such as identifying the driving session as involving a bicycle rather than a car based on optical data captured at a camera of the user device; vehicle performance parameters, such as acceleration rate, braking speed and/or distance, vibration, etc.); driving behavior (e.g., driving patterns based on movement features describing movement of a vehicle during a driving session; responses to traffic events; etc.); risk parameters (e.g., associated with vehicular accident events; with causing injury; of violating traffic-related laws; expected response in emergency situations; etc.); permission parameters (e.g., degree of access that a user has to different vehicle operation controls); relationship parameters (e.g., relationship between users associated with a driving session; relationship between users and vehicles, such as the relationship between the user and vehicle insurance for the vehicle, whether the user is authorized to drive the vehicle, whether the user is the owner of the vehicle; etc.), and/or any other suitable user characteristics.

Determining user characteristics S140 is preferably based on one or more movement features, but can additionally or alternatively be based on any suitable datasets (e.g., derived from Blocks S110-S120 in accordance with one or more variations of Block S130, raw data collected in accordance with one or more variations of Blocks S110-S120, etc.). In a variation, determining user characteristics can be based on location data (e.g., movement features extracted from location data; route traces extracted from location datasets, including an origin point or destination point, etc.; etc.). For example, Block S140 can include determining user characteristics based on a location of a user device associated with a driving session (e.g., location of a user mobile computing device arranged within the vehicle). User device location can be indicative of classification of the user as driver or passenger. In specific examples, user device location proximal the front of the vehicle can be correlated with classification as a driver; user device location proximal the back of the vehicle and/or passenger side door of the vehicle can be correlated with a passenger classification; user device location at a user device mount positioned at the vehicle can be correlated with a driver classification; user device location in a hand of a user can be correlated with a passenger classification; however, any suitable user device locations can be correlated in any suitable manner with any suitable user characteristics. In a specific example, the method 100 can include: collecting location data (and/or other suitable data) associated with known user device locations (e.g., in a user device mount; in a user's hand; in a pocket; on the dashboard; in a vehicle's back passenger seats; etc.); extracting movement features from the location data and correlated with the known user device locations; generating a user characterization model (e.g., deep learning model; other machine learning model; etc.) based on the movement features; and applying the user characterization model in classifying user device location for a current driving session. In another specific example, capacitive proximity sensor data, optical data (e.g., upon which computer vision algorithms can be applied; camera data and/or ambient light data indicating whether the user device is within an enclosed proximal space such as a user's pocket; etc.), audio data, and/or other suitable data from a user device can be used in determining user device micro-location within a vehicle in relation to, for example, users, vehicle components, and/or other suitable components (e.g., whether a device is in a user's hand, user's pocket, a cupholder, in a dashboard device mount, etc.). In another specific example, user characteristics can be derived from location features extracted from signal data, such as determining the location of a user device based on signal receipt parameters (e.g., for signals received by the user device, such as signals transmitted by a wirelessly paired vehicle; for signals received by the vehicle from the user device; etc.) such as signal angle of arrival, signal time of arrival, and/or other suitable signal receipt parameters. Collected signal data can be transformed into location features through empirical modeling (e.g., k-nearest neighbor), mathematical modeling (e.g., trilateration, triangulation, Bayesian statistical analysis, Kalman filtering, etc.), and/or any suitable operations. However, determining user characteristics based on location data can be performed in any suitable manner.

In another variation, determining user characteristics S140 can be based on motion data (e.g., movement features extracted from motion data, etc.). In examples, Block S140 can include classifying a user as a driver and/or passenger based on user motion features associated with the user entering and/or exiting a vehicle. In a specific example, the method 100 can include: while the user is entering a vehicle during a driving session, collecting a motion dataset (e.g., sampled at inertial sensors of a user smartphone coupled to the user; etc.); and determining whether the user is entering the vehicle through a driver seat door or a passenger seat door based on the motion dataset and/or other suitable datasets (e.g., inferring based on the directionality of the user's movement and a vehicle movement dataset indicating the directionality of the parked vehicle, the vehicle model type, the locations of different vehicle doors, types of vehicle doors; etc.). In another specific example, the method 100 can include: while the user is exiting the vehicle during a post-trip time period, collecting a motion dataset (e.g., at a motion sensor of the user's mobile device); and determining the relative motion of the user to the vehicle heading, wherein the vehicle heading is predetermined based on the in-trip time period (e.g., from a movement dataset collected in the in-trip time period, from vehicle motion features extracted from a movement dataset, etc.), in order to determine whether the user is exiting the vehicle on the driver's side or the passenger's side of the vehicle. In a related example, the method 100 can include determining whether the user is exiting fore or aft of another user on the same side (e.g., to discriminate between a driver and a passenger exiting the vehicle on the driver's side). In another specific example, movement profiles associated with a user entering and/or exiting a vehicle can be generated for users based on movement features extracted from motion datasets collected during time periods of entering and/or exiting a vehicle (e.g., walking patterns in relation to the location and/or directionality of the parked vehicle; amount of multi-axis displacement as the user transitions from a standing position proximal the vehicle to a seated position within the vehicle; PVA data describing the user entering and/or exiting the vehicle, such as time taken to enter the vehicle and initiate vehicle operation; etc.). In another example, Block S140 can include determining user characteristics based on motion data collected during a driving session. In a specific example, determining user characteristics can be based on alignment of a user device relative a gravity vector and/or other suitable vector (e.g., a horizontal user device position relative a gravity vector indicating a user device position on the vehicle floor such as below a seat, a user device position laying flat on top of a seat or dashboard, which can correlate to classification as a driver or passenger; a vertical user device position relative a gravity vector can indicate a user device positioned in a user device mount, correlating to classification as a driver; etc.). In another specific example, motion data for the user device indicating that the user device is transitioning from being held by a first user to being held by a second user can be correlated with classification of the first user as a driver (e.g., where the driver is handing a user smartphone to a passenger because the driver's inability to operate the user smartphone during the driving session). However, determining user characteristics based on motion data can be performed in any suitable manner.

In another variation, Block S140 can be based on user datasets. In examples, determining user characteristics can be based on driving behavior datasets, such as through generating reference user driving behavior profiles which can be used in comparisons with a driving behavior profile generated for a current driver of the vehicle (e.g., where a driving behavior similarity score exceeding a threshold can be used to identify a driver of the vehicle, etc.). In a specific example, driving behavior profiles can be generated based on route datasets, such as a route history indicating frequented origins and destinations for a particular user, where the user can be identified as the driver based on a current origin and destination matching a frequented origin and destination. In another specific example, driving behavior profiles can be generated based on PVA data for a driver (e.g., an average velocity for a driver at a location and/or route). Additionally or alternatively, driving behavior profiles can be generated based on any suitable movement data (e.g., frequency, duration, time of day associated with driving sessions, etc.) and/or supplemental data. In examples, determining user characteristics can be based on one or more of: social media datasets (e.g., comparing driving behaviors derived from social media posts and/or actions to driving behaviors associated with a current driving session, such as through extracting a list of frequented destinations based on social media check-ins by the user and comparing a current destination to the list; etc.), device event datasets (e.g., correlating a frequent or high number of device events with a passenger classification; correlating a driver classification with application usage during the driving session, such as a usage of a navigation application, a ride sharing application; etc.), demographic data (e.g., correlating a higher age with increased likeliness to be a driver; identifying the combination of users in a vehicle based on applications executing on the user devices, and determining that a particular user of the combination of users is driving based on historic driving sessions with the combination of users where the particular user drove the vehicle; etc.) and/or any other suitable data. Determining user characteristics can additionally or alternatively include determining a driver status substantially as described in U.S. application Ser. No. 14/206,721, filed 12 Mar. 2014, which is incorporated herein by this reference. However, determining user characteristics based on behavior datasets can be performed in any suitable manner.

Block S140 can additionally or alternatively include inferring user data from supplementary data; for example, Block S140 can include determining that the user's mobile device has not paired with a vehicle's computer system (e.g., via Bluetooth), and thereby infer that the user is not driving the vehicle (e.g., because their mobile device does not automatically recognize the vehicle).

In variations, Block S140 can be based on audio datasets (e.g., classifying a user as a driver based on audio data of the user asking for navigation aid; etc.), optical datasets (e.g., object classification of internal vehicle-facing optical data to identify users and whether they are sitting in a driver seat or passenger seat; comparison of user device optical data from a plurality of user devices capturing similar objects and associated with similar temporal indicators, where the comparison can indicate relative location of the users within the vehicle; identifying users and/or associated demographic information based on facial recognition and computer vision; ambient light datasets indicating proximity of surrounding objects; etc.), vehicle operation data (e.g., user control of vehicle mirror positioning, seat positioning, media center operation such as which user device is paired with the media center, vehicle lock mechanisms, vehicle initiation or termination operations in relation to associated movement datasets; comparisons of such vehicle operation data to user vehicle operation profiles generated from historical vehicle operation data, in order to classify users; etc.), traffic data (e.g., driving behavior in a high-traffic level situation; user preferences in relation type of vehicular path, such as avoiding freeways and/or tolls; driving behavior in relation to traffic laws, such as a driver historically driving above a speed limit on a particular freeway; origin and destination data; etc.), biometric datasets (e.g., user profiles for cardiovascular parameters such as heart rate and/or blood pressure during driving sessions; biometric datasets collected from biometric vehicle locking, unlocking, and/or other biometric-related vehicle controls; etc.), environmental datasets (e.g., temperature sensor data indicating positioning of the user device in a pocket, on a user's body, on a mount, on top of a dashboard, etc.), and/or any other suitable datasets.

Block S140 preferably includes determining user characteristics with a user characterization model (e.g., using movement features and/or other suitable datasets for inputs; outputting user characteristics and/or associated confidence levels; etc.) including any one or more of: probabilistic properties, heuristic properties, deterministic properties, and/or any other suitable properties. In examples, Block S140 and/or other portions of the method 100 (e.g., applying user-related action model for determining user-related actions) can employ machine learning approaches including any one or more of: supervised learning, unsupervised learning, semi-supervised learning, reinforcement learning, regression, an instance-based method, a regularization method, a decision tree learning method, a Bayesian method, a kernel method, a clustering method, an associated rule learning algorithm, a neural network model, a deep learning algorithm, a dimensionality reduction method, an ensemble method, and/or any suitable form of machine learning algorithm. In relation to Block S140, training data and/or inputs for user characterization models can include datasets collected in Blocks S110-S120, and/or any suitable datasets associated with the method 100. In a specific example, the method 100 can include collecting a set of movement datasets for one or more users during historic driving sessions, the set of movement datasets including labels for classification of the one or more users as a driver and/or passenger for the driving sessions; training a neural network model (e.g., recurrent neural network model) with the set of movement datasets; collecting a current movement dataset for a user during a current driving session; and determining one or more user characteristics based on inputting the current movement dataset into the neural input layer of the neural network model. The model preferably models passenger behavior types versus driver behavior types, in relation to movement datasets (e.g., in-trip movement datasets defining whether the mobile device is being handled, how frequently it is being handled, what vehicle behavior was occurring at the in-trip time point corresponding to the extracted motion feature related to device handling, what types of user interaction are occurring at the mobile device, what applications are being utilized on the mobile device during the in-trip period, etc.), and outputs a probability that a user is a driver (or a passenger). The probability can be thresholded to determine whether the user is a driver, a passenger, or an indeterminate class (e.g., neither probably a driver nor probably a passenger, wherein further information and/or processing is required to confidently classify the user, and/or an "unsure", "indeterminate", or similar class label can be an output of the thresholding operation).

The user characterization model can additionally or alternatively include auxiliary factors in characterizing a user. Auxiliary factors can include geographic factors, temporal factors, and any other suitable non-movement related factors. For example, in certain geographic locations (e.g., San Francisco, New York City, Los Angeles, other urban areas, etc.) the probability that a user utilizes a ride sharing or taxi service can be elevated, and thus the model can include applying a geographically based heuristic in determining whether the user is a passenger or a driver (e.g., wherein a lower probability of being a passenger may result in classification as a passenger due to the prevalence of ride sharing in the geographic location, versus a user in a different geographic location with the same lower probability not being classified as a passenger). In another example, trips taken within a certain range of times during the day can correspond to different driver behaviors or passenger behaviors (e.g., due to average traffic conditions corresponding to rush hours), and driver/passenger behaviors corresponding to the range of times can be used as a basis for the user characterization model utilized during that range of times (e.g., wherein a different model is used outside the range of times).

In a specific example, Block S140 includes classifying the user using a driver discrimination model trained using a corpus of movement datasets collected from a population of users over a set of in-trip time periods and post-trip time periods, utilizing any suitable training techniques and/or processes (e.g., as described above). The training of the driver discrimination model can utilize a Gaussian mixture model to cluster driver types and/or passenger types (e.g., between 7-9 driver types, 7-9 passenger types, etc.) based on labeled movement datasets and/or motion features (e.g., wherein the datasets or feature sets are labeled as corresponding to a driver or passenger); however, any other suitable clustering technique can be utilized. In this example, movement datasets can be removed from the corpus if they are determined to correspond to passenger-related data (e.g., wherein the user associated with the movement dataset was classified as a passenger), in instances wherein a driver model is desired. In related examples, movement datasets can be removed from the corpus if they are determined to correspond to driver-related data (e.g., wherein the user associated with the movement dataset was classified as a driver), in instances wherein a passenger model is desired in such related examples.

In another specific example, Block S140 can include utilizing a user-specific model to classify the user. In this example, Block S140 can include implementing a hierarchical classification process. In one variation of the hierarchical classification process, Block S140 includes first categorizing a user's trips and associated data into categories based on starting points, end points, start times (e.g., of day), and end times (e.g., of day), and utilizing in-trip behavior (e.g., in-trip movement datasets and associated motion or location features) to build a user-specific classification model to classify the user as one of a driver or passenger in each trip among the categories of trips. If the probability that the user is a driver or a passenger in each of the trips falls below a threshold value (e.g., wherein the user-specific model does not have an adequate success rate in classifying the user for each trip of the specified category), the hierarchical process includes recategorizing the trips based only on starting points and ending points (e.g., without consideration of start times or end times), and build a user-specific classification model based on the new categories (e.g., location specific categories, a coarser set of categories, a lower resolution set of categories wherein each category includes more trips, etc.).

In variations of Block S140, different user characterization models (e.g., generated with different algorithms, with different sets of features, with different input and/or output types, etc.) can be used (e.g., determined; selected, stored, retrieved, executed, updated, etc.) based on one or more of: movement datasets (e.g., selecting different models to execute based on different PVA ranges, etc.), supplemental datasets (e.g., based on the type of users participating in the driving session, such as based on the different driving behavior profiles associated with corresponding user account; based on the number of user devices arranged within the vehicle; based on age ranges for the users within the vehicle; based on different user devices and available sensors from which to collect datasets; based on different routes; etc.), and/or any other suitable criteria. Using a plurality of user characterization models (and/or other suitable models) suited to different contexts can confer improvements to the system 200 by improving user characterization accuracy (e.g., by tailoring analysis to a particular driving session, vehicle, user, and/or other entity, etc.), retrieval speed for the appropriate model from a database (e.g., by associating tailored user characterization models with particular user accounts and/or other identifiers), training and/or execution of models (e.g., where the user characterization models are associated with a subset of a pool of potential features correlated with user characteristics, and where the remaining unselected features are less correlated with the user characteristics), and/or other suitable aspects of the system 200. However, any suitable number and/or type of user characterization models can be used in any suitable manner. Additionally or alternatively, in relation to Block S140, determining user characteristics can be performed using threshold conditions (e.g., classifying a user as a passenger or driver based on whether a number of device events over a portion of the driving session exceeds or is below a threshold number of device events, etc.), reference profiles (e.g., comparison of a current driving behavior profile to reference driving behavior profiles associated with particular user characteristics, users, user accounts, vehicles, etc.), and/or any other suitable data.

Block S140 can include determining user characteristics at predetermined time intervals, in temporal relation (e.g., in response to, concurrently, in real-time, etc.) to trigger conditions (e.g., receiving a threshold amount and/or types of data; detecting a plurality of users associated with a driving session, such as through identifying a plurality of user accounts collecting data for the driving session; in response to identifying a driving session, such as initiation of vehicle operation or preparation to initiate vehicle operation; etc.), and/or at any suitable time and frequency.

In another example, a supplementary dataset collected in accordance with one or more variations of Block S120 can define a user interaction with an application executing a mobile device, and Block S140 can include classifying the user as one of the passenger and the driver based on the user interaction (e.g., wherein a user that is texting on a texting application during the in-trip period can be classified as a passenger, wherein a user that is utilizing a handsfree voice call application during the in-trip period can be classified as a driver, etc.)

In variations, Block S140 can include classifying a user as one of a driver or passenger based on an inference engine that combines in-trip movement features and post-trip movement features. In such variations, the inference engine generates the user classification as an output. In-trip movement features can include mobile device utilization frequency, comparison of vehicle motion to motion features of the mobile device (e.g., whether the vehicle is stopped while the device is moving, which can correlate to a driver handling the device, or whether the device is moving during vehicle motion, which can correlate to a passenger handling the device, etc.), and any other suitable movement features (e.g., as described above). Post-trip movement features can include exit behavior (e.g., an accelerometer pattern corresponding to a left-hand turn and upward acceleration for a diver, an accelerometer pattern corresponding to a right-hand turn and upward acceleration for a passenger, etc.), a time point of user interaction (e.g., whether a user picks up and engages with a smartphone proximal to vehicle stoppage, which can correspond to a driver, or is engaged with the smartphone during vehicle deceleration and/or stoppage, which can correspond to a passenger, etc.). The inference engine can incorporate both in-trip and post-trip movement features to classify the user; for example, the in-trip movement features can indicate that a user is a driver with a first probability (e.g., 52%, 46%, 80%), and the post-trip movement features can indicate the user is a driver with a second probability (e.g., 20%, 85%, etc.), and the inference engine can compute a third probability based on the first and second probability (e.g., which can be higher or lower than the first and second probability taken in isolation) in order to classify the user as one of a passenger or a driver (e.g., based on the first, second, and/or third probability exceeding a threshold probability). Inference can be performed during the post-trip time period, subsequent to the post-trip time period (e.g., delayed by an hour, a week, 15 minutes, and/or any other suitable delay), and/or at any other suitable time.

However, determining user characteristics S140 can be performed in any suitable manner.

3.5 Initiating a User-Related Action

Figure 4:
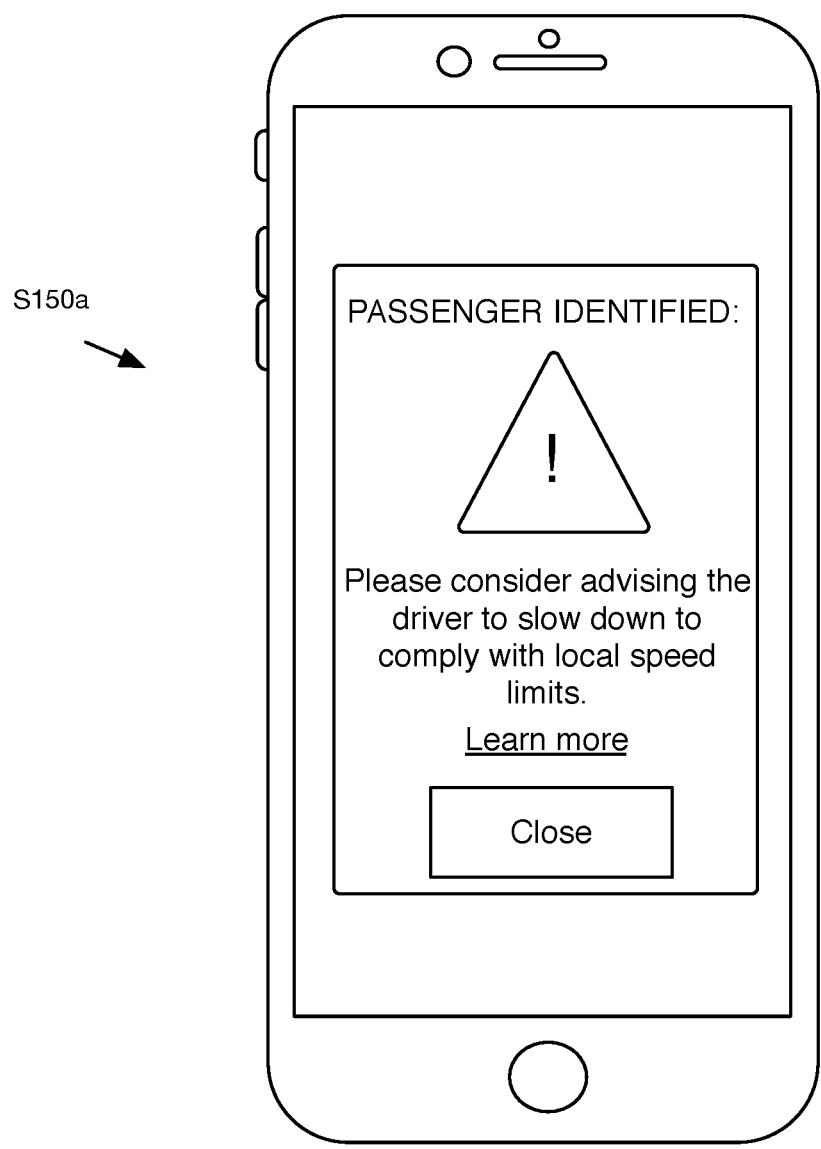
FIG. 4 depicts a specific example of a user-related action associated with a variation of the method.

The method 100 can additionally or alternatively include Block S150, which includes initiating a user-related action based on the one or more user characteristics. Block S150 functions to determine, promote, provide, and/or otherwise initiate a user-related action for responding to determination of one or more user characteristics. User-related actions can include any one or more of: user-related notifications (e.g., including user characteristics; as shown in FIG. 4), insurance processing, dataset processing (e.g., storing datasets based on user characteristics, such as storing movement datasets for a driving session in association with a user account identifying the user classified as a driver for the driving session, where such processing can confer improvements in data storage and/or data retrieval, such as for generating driving behavior profiles upon which a user-related action such as insurance processing can be based; etc.), and/or other suitable types of user-related actions.

In a variation of Block S150, initiating user-related notifications can include generating and/or presenting user-related notifications including any one or more of: educational notifications (e.g., including user characteristics such as driving behavior; advice on driving behavior, traffic parameters, biometric-related information; etc.), services notifications (e.g., for facilitating third party services, such as insurance services and/or processing, emergency services, roadside assistance services; vehicle repair services; technical services for autonomous vehicles; etc.), and/or any other suitable notifications. Initiating user-related notifications can include presenting (e.g., transmitting from a remote server) the user-related notifications to one or more of: a user device (e.g., associated with the driver; associated with the passenger; associated with contacts stored at the user device, friends, family; etc.), a third party (e.g., an insurance company database; devices associated with third party services; etc.), a vehicle (e.g., for display at a vehicle media system; etc.), and/or any other suitable entity. However, initiating user-related notifications can be performed in any suitable manner.

In another variation of Block S150, facilitating insurance processing can include any one or more of: processing insurance claims (e.g., pre-filling insurance claims, transmitting insurance claims, etc.), insurance education, transmitting user characteristics (e.g., risk parameters) and/or associated information (e.g., datasets collected in Block S110-S120) to an insurance company and/or related entities, and/or any other suitable action. In an example, Block S150 can include automatically filling and transmitting a first notice of loss (FNOL) with information for a user classified as the driver (e.g., in Block S140), based on user characteristics (e.g., driving behavior, etc.), movement datasets (e.g., PVA data, etc.), and/or supplementary datasets (e.g., user demographic data, etc.), such as after a vehicular accident event and/or manual request by the user. However, facilitating insurance processing can be performed in any suitable manner.

In another variation of Block S150, initiating a user-related action can include controlling one or more user devices (e.g., including supplemental sensors from which supplemental datasets are collected) to promote the user-related action (e.g., through generating control instructions for the user devices, such as at a remote computing system, and transmitting the control instructions to the user devices; through activating an application executable on the user device; etc.). In an examples, controlling one or more user devices can include controlling user devices to sample datasets, present user-related notifications, modify vehicle operation and/or parameters of a driving session (e.g., environmental parameters such as temperature and/or lighting), and/or perform any suitable process. Additionally or alternatively, controlling user devices can be performed in any suitable manner.

Relating to Block S150, automatically initiating a user-related action is preferably performed in response to (and/or in another suitable temporal relationship to) detecting one or more user characteristics response actions, but can be in temporal relation to another trigger condition (e.g., a user characteristic confidence level exceeding a threshold; determining a specific type of user characteristic, such as classification as a driver and/or passenger; etc.), at predetermined time intervals, and/or at any suitable time and frequency. For example, Block S150 can include in response to classifying a user as a driver, storing datasets for the driving session with a user account identifying the user; and presenting an educational notification, tailored to a driving behavior profile associated with the user account, at a user device associated with the user. However, initiating user-related actions can be performed in any suitable manner.

In a variation, Block S150 can include recording user data. For example, Block S150 can include tracking a user's time spent as a driver and/or passenger (e.g., based on a classification of the user as one of a driver and a passenger in accordance with one or more variations of Block S140) across a set of trips, and maintaining a record of the user's time spent as a driver and/or passenger (e.g., at a driver management system, at a remote computing system, at an insurance related system, at any other suitable database or system, etc.).

In another variation, Block S150 can include controlling the mobile device based on user characteristics (e.g., based on whether the user is classified as a driver or passenger, based on the risk behavior of the user, etc.). For example, Block S150 can include automatically locking the mobile device (e.g., rendering the mobile device insensitive to touch inputs) based on classifying the user as the driver. In another example, Block S150 can include Block S150a: automatically generating and providing a notification to the user of the mobile device in response to classifying the user as a passenger and detecting an aberrant vehicle motion feature (e.g., a notification to tell the driver to slow the vehicle to comply with local speed limits, as shown by example in FIG. 4). However, Block S150 can additionally or alternatively include controlling the mobile device in any suitable manner based on user characteristics (e.g., determined in accordance with one or more variations of Block S140).

3.6 Further Specific Examples

Figure 6:
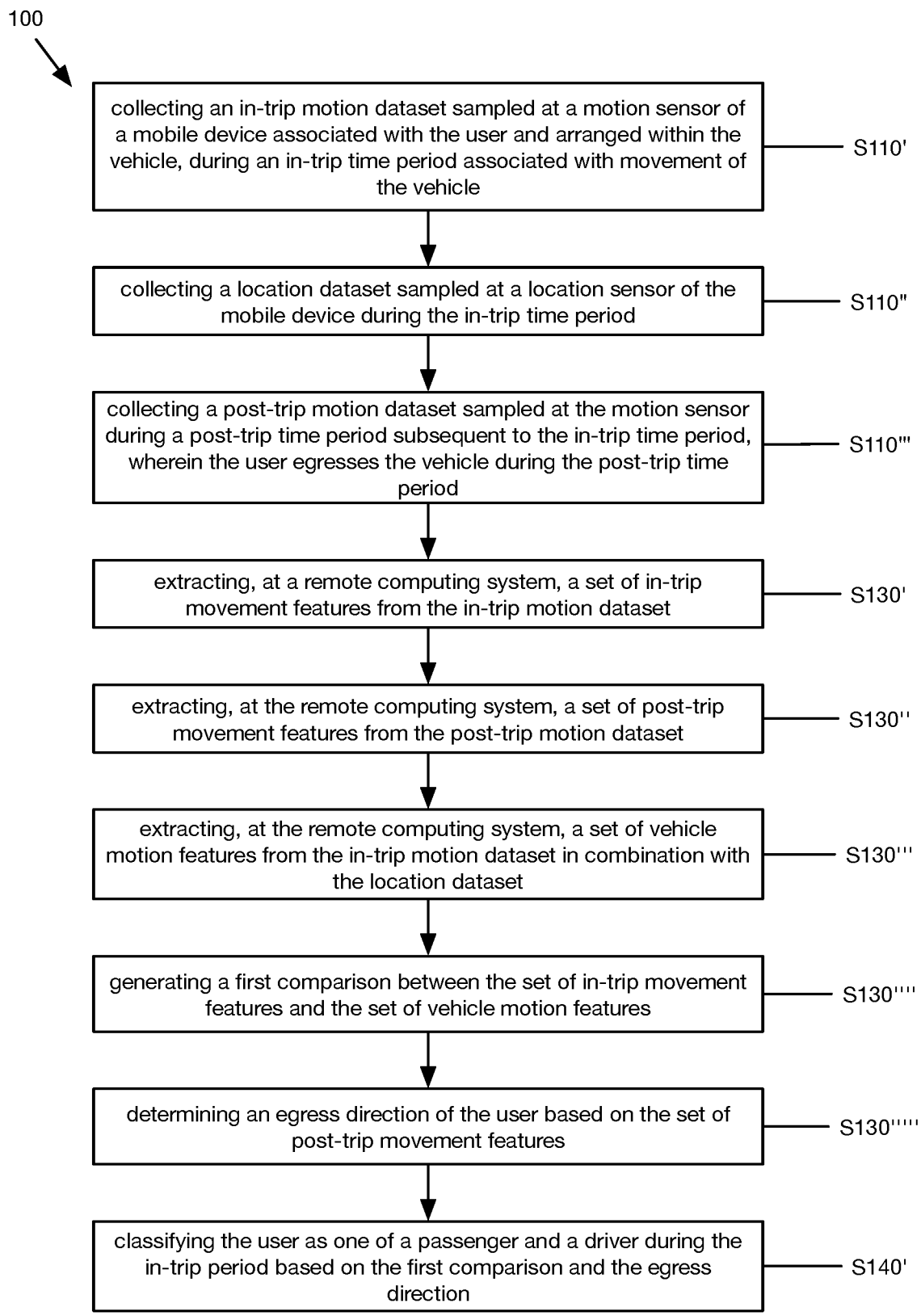
FIG. 6 depicts a specific example implementation of a variation of the method.

In a first specific example, as shown in FIG. 6, the method 100 includes: collecting an in-trip motion dataset sampled at a motion sensor of a mobile device associated with the user and arranged within the vehicle, during an in-trip time period associated with movement of the vehicle S110'; collecting a location dataset sampled at a location sensor of the mobile device during the in-trip time period S110"; collecting a post-trip motion dataset sampled at the motion sensor during a post-trip time period subsequent to the in-trip time period, wherein the user egresses the vehicle during the post-trip time period S110'''; extracting, at a remote computing system, a set of in-trip movement features from the in-trip motion dataset S130'; extracting, at the remote computing system, a set of post-trip movement features from the post-trip motion dataset S130"; extracting, at the remote computing system, a set of vehicle motion features from the in-trip motion dataset in combination with the location dataset S130'''; generating a first comparison between the set of in-trip movement features and the set of vehicle motion features S130''''; determining an egress direction of the user based on the set of post-trip movement features S130'''''; and classifying the user as one of a passenger and a driver during the in-trip period based on the first comparison and the egress direction S140'.

Figure 7:
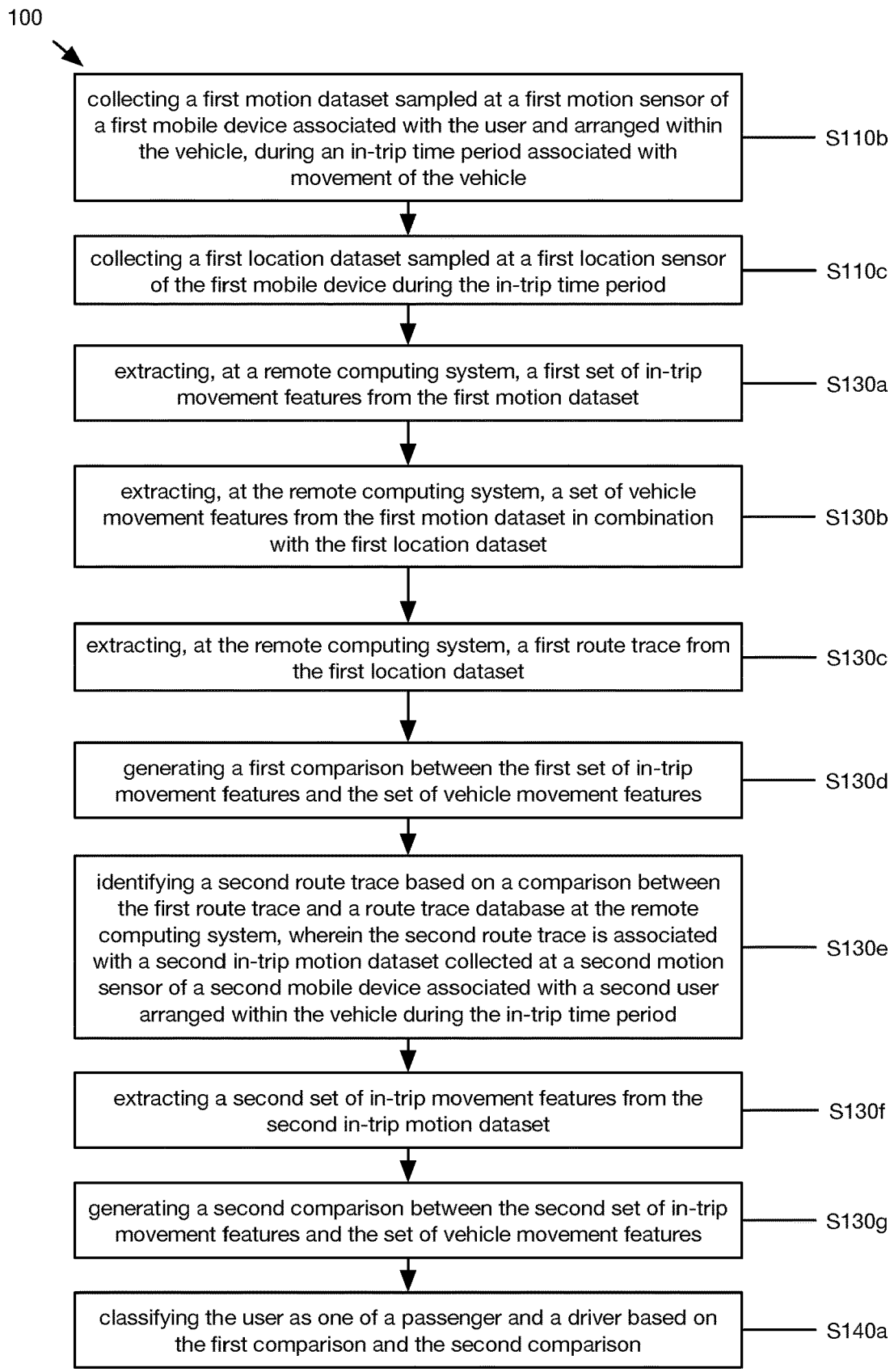
FIG. 7 depicts a specific example implementation of a variation of the method.

In a second specific example, as shown in FIG. 7, the method 100 includes: collecting a first motion dataset sampled at a first motion sensor of a first mobile device associated with the user and arranged within the vehicle, during an in-trip time period associated with movement of the vehicle S110b; collecting a first location dataset sampled at a first location sensor of the first mobile device during the in-trip time period S110c; extracting, at a remote computing system, a first set of in-trip movement features from the first motion dataset S130a; extracting, at the remote computing system, a set of vehicle movement features from the first motion dataset in combination with the first location dataset S130b; extracting, at the remote computing system, a first route trace from the first location dataset S130c; generating a first comparison between the first set of in-trip movement features and the set of vehicle movement features S130d; identifying a second route trace based on a comparison between the first route trace and a route trace database at the remote computing system, wherein the second route trace is associated with a second in-trip motion dataset collected at a second motion sensor of a second mobile device associated with a second user arranged within the vehicle during the in-trip time period S130e; extracting a second set of in-trip movement features from the second in-trip motion dataset S130f; generating a second comparison between the second set of in-trip movement features and the set of vehicle movement features S130g; and classifying the user as one of a passenger and a driver based on the first comparison and the second comparison S140a.

However, in additional or alternative examples, the method 100 can include any suitable combination, permutation, and variation of the Blocks described above and/or variations thereof, in any suitable order.

The method 100 and/or system 200 of the embodiments can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a patient computer or mobile device, or any suitable combination thereof. Other systems and methods of the embodiments can be embodied and/or implemented at least in part as a machine configured to receive a computer-readable medium storing computer-readable instructions. The instructions can be executed by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor, though any suitable dedicated hardware device can (alternatively or additionally) execute the instructions.

The FIGURES illustrate the architecture, functionality and operation of possible implementations of systems, methods and computer program products according to preferred embodiments, example configurations, and variations thereof. In this regard, each block in the flowchart or block diagrams can represent a module, segment, step, or portion of code, which includes one or more executable instructions for implementing the specified logical function(s). It should also be noted that, in some alternative implementations, the functions noted in the block can occur out of the order noted in the FIGURES.

As a person skilled in the art will recognize from the previous detailed description and from the figures and claims, modifications and changes can be made to the embodiments of the invention without departing from the scope of this invention as defined in the following claims. The embodiments include every combination and permutation of the various system components and the various method processes, including any variations, examples, and specific examples.

We claim:

1. A method for characterizing a user associated with a vehicle, comprising:
    collecting an in-trip motion dataset sampled at an accelerometer of a mobile device associated with the user and arranged within the vehicle, during an in-trip time period associated with movement of the vehicle;
    collecting a location dataset sampled at a GPS sensor of the mobile device during the in-trip time period;
    collecting a post-trip motion dataset sampled at the accelerometer during a post-trip time period subsequent to the in-trip time period, wherein the vehicle is parked and the user egresses the vehicle during the post-trip time period, and wherein the post-trip motion dataset comprises turning data associated with the mobile device;
    extracting, at a remote computing system, a set of in-trip movement features associated with the mobile device from the in-trip motion dataset;
    extracting, at the remote computing system, a set of post-trip movement features associated with the mobile device from the post-trip motion dataset, wherein the set of post-trip movement features comprises a turning radius of the mobile device;
    extracting, at the remote computing system, a set of vehicle motion features from the in-trip motion dataset in combination with the location dataset;
    generating a first comparison between the set of in-trip movement features associated with the mobile device and the set of vehicle motion features;
    determining an egress direction of the user based on the set of post-trip movement features;
    classifying the user as one of a passenger and a driver during the in-trip period based on the first comparison and the egress direction; and
    updating a risk profile associated with the user based on classifying the user as one of the passenger and the driver during the in-trip period.

2. The method of claim 1, further comprising collecting a supplementary dataset during the in-trip period using the mobile device, wherein the supplementary dataset comprises an audio-visual dataset collected using an audio-visual sensor of the mobile device, and extracting the set of in-trip movement features from the in-trip movement dataset in combination with the audio-visual dataset.

3. The method of claim 1, further comprising collecting a supplementary dataset during the post-trip period using the mobile device, wherein the supplementary dataset defines a user interaction with an application executing on the mobile device, and wherein classifying the user as one of the passenger and the driver is based on the user interaction.

4. The method of claim 3, further comprising determining that the user transmitted a text message by way of the mobile device proximal in time to an initial time point of the post-trip time period, and classifying the user as the driver based on the determination that the user transmitted the text message.

5. The method of claim 1, further comprising classifying the user as the passenger for a first portion of the in-trip period and classifying the user as a driver for a second portion of the in-trip period based on the first comparison.

6. The method of claim 1, wherein determining the egress direction of the user based on the set of post-trip movement features comprises extracting the user egress direction relative to a vehicle heading, wherein the vehicle heading is determined based on the set of vehicle motion features.

7. The method of claim 6, further comprising classifying the user as the driver based on the user egress direction comprising a left egress direction relative to a forward vehicle heading.

8. The method of claim 1, further comprising controlling the mobile device to transmit a message based on classifying the user as the driver.

9. The method of claim 8, wherein controlling the mobile device to transmit a message comprises transmitting a record that the user was the driver during the in-trip time period to the remote computing system.

10. The method of claim 1, wherein the location dataset collected at the mobile device indicates the location of the mobile device within the vehicle and the geographic location of the mobile device, further comprising determining a location of the user within the vehicle based on the location of the mobile device within the vehicle, and classifying the user as one of the passenger and the driver during the in-trip period based on the location of the mobile device within the vehicle.

11. The method of claim 1, further comprising classifying the user using a driver discrimination model trained using a corpus of movement datasets collected from a population of users over a set of in-trip time periods and post-trip time periods.

12. The method of claim 1, further comprising extracting, at the remote computing system, a first route trace from the location dataset, wherein the in-trip time period defines a set of time points, and wherein the first route trace comprises a vehicle position and a vehicle heading associated with each of the set of time points.

13. The method of claim 12, further comprising:
identifying a second route trace based on a comparison between the first route trace and a route trace database at the remote computing system, wherein the second route trace is associated with a second in-trip motion dataset collected at a second motion sensor of a second mobile device associated with a second user arranged within the vehicle during the in-trip time period;
extracting a second set of in-trip movement features from the second in-trip motion dataset;
generating a second comparison between the second set of in-trip movement features and the set of vehicle motion features; and
classifying the user as one of a passenger and a driver during the in-trip period based on the first comparison and the second comparison.

14. A method for characterizing a user associated with a vehicle, comprising:
collecting a first motion dataset sampled at a first motion sensor of a first mobile device associated with the user and arranged within the vehicle, during an in-trip time period associated with movement of the vehicle;
collecting a first location dataset sampled at a first location sensor of the first mobile device during the in-trip time period;
extracting, at a remote computing system, a first set of in-trip movement features from the first motion dataset;
extracting, at the remote computing system, a set of vehicle movement features from the first motion dataset in combination with the first location dataset;
extracting, at the remote computing system, a first route trace from the first location dataset, wherein the first route trace defines a first sequence of data, wherein the first sequence of data comprises a first set of times and a first set of positions associated with the first set of times;
generating a first comparison between the first set of in-trip movement features and the set of vehicle movement features;
identifying a second route trace based on a comparison between the first route trace and a set of route traces at a route trace database at the remote computing system, wherein the second route trace defines a second sequence of data, wherein the second sequence of data comprises a second set of times and a second set of positions associated with the second set of times, wherein the comparison matches the first sequence of data to the second sequence of data, wherein the second route trace is associated with a second in-trip motion dataset collected at a second motion sensor of a second mobile device associated with a second user arranged within the vehicle during the same in-trip time period as the first motion dataset;
extracting a second set of in-trip movement features from the second in-trip motion dataset;
generating a second comparison between the second set of in-trip movement features and the set of vehicle movement features;
classifying the user as one of a passenger and a driver based on the first comparison and the second comparison; and
updating a risk profile associated with the user based on classifying the user as one of the passenger and the driver during the in-trip period.

15. The method of claim 14, further comprising one of: classifying the second user as the driver based on classifying the user as the passenger, and classifying the second user as the passenger based on classifying the user as the driver.

16. The method of claim 14, further comprising determining that the vehicle is operating autonomously during the in-trip time period, and in response: classifying the user and the second user as passengers.

17. The method of claim 14, further comprising collecting a first post-trip motion dataset sampled at the first motion sensor during a post-trip time period subsequent to the in-trip time period, wherein the user egresses the vehicle during the post-trip time period.

18. The method of claim 17, further comprising extracting a first user egress direction relative to a vehicle heading from the first post-trip motion dataset, and classifying the user as one of the driver and the passenger based on the first user egress direction, wherein the vehicle heading is determined based on the set of vehicle movement features.

19. The method of claim 18, wherein the second motion dataset comprises a second post-trip motion dataset, further comprising extracting a second user egress direction relative to the vehicle heading from the second post-trip motion dataset, generating a comparison between the first user egress direction and the second user egress direction, and classifying the second user as one of the driver and the passenger based on the comparison.

20. The method of claim 14, wherein the first location dataset indicates the location of the first mobile device within the vehicle and the geographic location of the mobile device, further comprising determining a location of the user within the vehicle based on the location of the mobile device within the vehicle, and classifying the user as one of the passenger and the driver during the in-trip period based on the location of the mobile device within the vehicle.

* * * * *